UNITED STATES PATENT OFFICE.

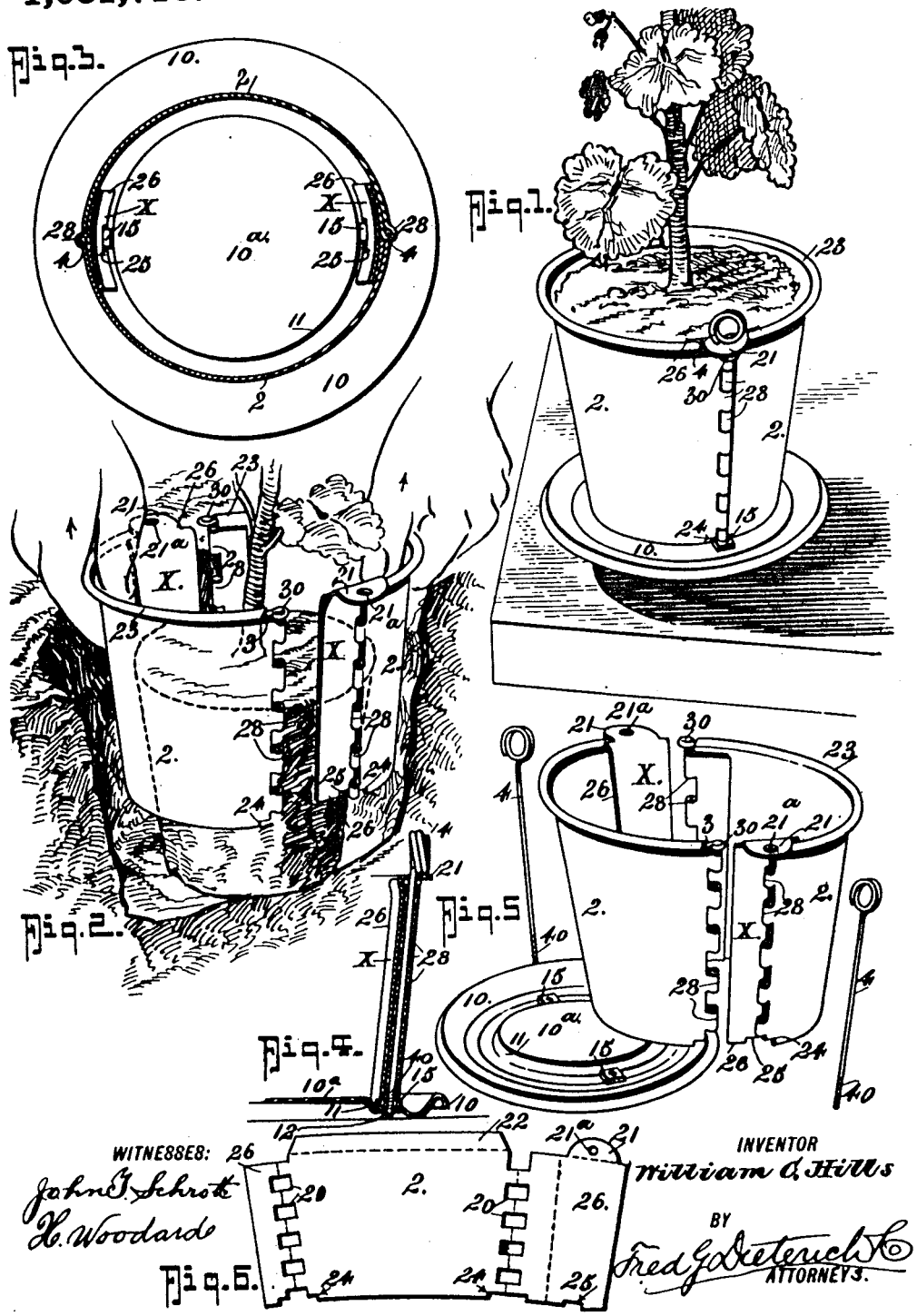

WILLIAM C. HILLS, OF SANDPOINT, IDAHO, ASSIGNOR OF ONE-HALF TO CHARLES KREILING, OF SANDPOINT, IDAHO, AND ONE-HALF TO ELMER W. BENNETT, OF COLBURN, IDAHO.

TRANSPLANTING-POT.

1,031,713. Specification of Letters Patent. Patented July 9, 1912.

Application filed August 5, 1911. Serial No. 642,478.

*To all whom it may concern:*

Be it known that I, WILLIAM C. HILLS, residing at Sandpoint, in the county of Kootenai and State of Idaho, have invented a new and Improved Transplanting-Pot, of which the following is a specification.

This invention relates to improvements in that class of devices, or means for transplanting, whereby plants may be conveniently and easily placed in the ground from the hot house or forcing bed, and it primarily has for its object to provide a means of the type stated of an economical nature, in which the parts are especially designed for being quickly removed from the plant when the latter has been transplanted without danger of breaking the soil around the roots or injuring the said roots.

With other objects in view that will be hereinafter stated, my invention consists of a transplanting pot embodying the peculiar and novel construction and combination of parts hereinafter fully explained, specifically pointed out in the appended claims, and illustrated in the accompanying drawings, in which:—

Figure 1, is a perspective view of my transplanting pot, a plant being shown therein. Fig. 2, is a similar view of the body portion of the pot and illustrates the manner in which the plant is transplanted. Fig. 3, is a horizontal section of the pot in complete shape. Fig. 4, is a vertical section of one side of the pot and particularly shows the coupling and interlocking members. Fig. 5, is a perspective view that shows the several parts which constitute the complete pot, separated, and Fig. 6, is a plan of one of the blank forms from which the sides of the body are made.

My improved transplanting pot comprises a two-part body, a base member and locking devices and these are so formed and adapted for coöperative connection that the pot members can be readily separated for releasing the transplanted soil and plant and as readily reassembled for use.

The body member and the bottom are of sheet metal stamped, or otherwise shaped up, and the bottom 10 has a central projection 10ᵃ surrounded by an annular flange 11, and at diametrically opposite sides, the said bottom has threaded apertures 12, the purpose of which will presently appear. The body of the pot is of the usual tapering shape and it is formed of two like half sections each of which consists of a substantially semi-circular member formed of a single piece of sheet metal bent to shape from a blank form having the shape shown in Fig. 6.

It will be noticed by now referring to Fig. 6, the blank 2 near the ends is formed with a number of uniformly positioned slots 20 and one end near the extreme outer edge has an apertured ear 21 and an extension 22, which when the body section is shaped up is bent over to form the bead 23 for a reinforcing wire strand 3, the ends of which terminate in eyes 30, the purpose of which will presently appear. At the smaller or lower edge, the blank, near its opposite ends is notched as at 24, and at a point in vertical alinement of the slots 20 at one end it has an additional notch 25 which when the parts are bent up registers with the adjacent notch 24.

It will be noticed, by reference to Fig. 6, the slots 20 in the blank member at one side are a considerable distance more inward from the adjacent edge than are the slots on the opposite end of the blank, and the object in thus placing the slots is to leave ample metal at one end to provide for a joint covering strip or plate 26 that covers the coupling portions of the two sections and leaves the internal surface of the pot practically entirely smooth, and it will be further noticed from Fig. 6 that the ear 21 is formed on the said strip portion of the blank approximately midway thereof, the reason for which will be apparent by referring to the drawing.

In bending or shaping the blank to form a side section of the pot, the opposite ends of the blank are bent midway of their slots 20 and over a pin or key so as to form a series of eyes 28, between each set of slots 20 and it should be stated that the slots in one end of the blank alternate with the eyes of solid portions of the said bland. The extension at one end of the blank is bent back upon the inside of the body only, while the other or long end of the body is first bent back upon the inside of the body and then again bent back upon itself to form the covering strip X proper and when thus bent out the ear 21 is turned down at right angles and outwardly so its aperture 21ᵃ comes into alinement with the eye 30 of the reinforce wire of the opposing body section, it being, understood that the eye 30 at the opposite end alines the aperture in ear 21 of the said opposing section when the parts are assembled, the notches 24—25, when the body is fitted upon the bottom 10 forming seats to fit over and receive the squared shoulders or abutments 15 that surround the threaded apertures 12 in the bottom plate 10, such arrangement of the parts being especially provided for holding the said pot body steady and in proper position for guiding the threaded ends 40 of the locking bolts 4 into the said apertures 12, it being further understood that the said rods or bolts 4 are passed down through the ears 21 and the opposing interlocking eyes 28 of the opposing sections before the threaded bolts engage the apertures in the bottom 1.

By reason of the peculiar construction of my transplanting pot the operation of transplanting can be quickly and effectively accomplished. When transplanting, the eye bolts 4, are sufficiently unscrewed to release and drop off the bottom 10, the tapering pot holding the plant with the soil intact. The open bottom pot is now placed in the hole prepared to receive the plant, after which, the eye bolts 4—4 are withdrawn (see Fig. 2) and the two sections of the body are removed from around the plant which is now packed in the earth in the usual manner.

This application is a continuation in part of my application filed August 30, 1910, Serial #579650, allowed July 25, 1911.

What I claim is:—

1. A transplanting pot, composed of identical sections, each consisting of a sheet metal member having its longitudinal edges bent back upon themselves, said member having portions cut away on the folds to leave hinge eyes, the hinge eyes of one member interprojecting with those of the other member, one of the bent back edge portions of each member being again bent forward and projecting beyond the hinge portion to form a guard for the hinge joints, and rods passing through said hinge portion to interlock said sections.

2. A transplanting pot, composed of identical sections, each consisting of a sheet metal member having its longitudinal edges bent back upon themselves, said member having portions cut away on the folds to leave hinge eyes, the hinge eyes of one member interprojecting with those of the other member, one of the bent back edge portions of each member being again bent forward and projecting beyond the hinge portion to form a guard, rods passing through said hinge portion to interlock said sections, the last named bent portion having an ear at its upper end bent outwardly and apertured for the passage of the hinge rod member.

3. A transplanting pot, composed of identical sections, each consisting of a sheet metal member having its longitudinal edges bent back upon themselves, said member having portions cut away on the folds to leave hinge eyes, the hinge eyes of one member interprojecting with those of the other member, one of the bent back edge portions of each member being again bent forward and projecting beyond the hinge portion to form a guard, rods passing through said hinge portion to interlock said sections, the upper edge of the said members being bent over to form beads, and a reinforced rod in each of the said beads, the ends of the said rods terminating in eyes to receive the hinge rods.

4. A transplanting pot, composed of two identical sections each having hinge eyes at the opposite longitudinal edges, one of the said edges being folded back and forth upon itself to form a guard for the adjacent hinge joint and extend beyond its adjacent hinge eyes, the hinge eyes on the two sections being arranged to interproject with each other, and the extended edge of one section projecting on the inside of the adjacent edge of the other section, a bottom member having threaded apertures, and hinge rod members removably engaging the hinge eyes, said rod members having their lower ends threaded to engage the threaded apertures in the bottom member.

5. A transplanting pot, composed of two sections each consisting of a sheet metal member bent to a semi-circular shape, the opposite ends of the sections having hinge eyes, the eyes of the two sections interprojecting, a bottom plate having threaded apertures surrounded by upwardly projected lugs, the bottom edges of the body sections having notches to seat over the said lugs, and rod members for engaging the hinge eyes, said rod members having their lower ends threaded to engage the threaded apertures in the bottom plate.

6. A transplanting pot composed of two identical sections each consisting of a sheet metal member tapered toward the bottom, each of said members having its longitudinal edges bent up into hinge eyes so arranged that the eyes of one section interlock with the eyes of the other section, a joint covering strip on one edge of each section, each of said strips having an out-turned ear having an aperture in line with the hinge eyes, the other edge of each section being bent over to form a bead, a reinforced wire in each bead, the ends of which terminate in eyes held in line with the hinge eyes, a bottom member having threaded apertures and rods that pass through the apertured ears, the reinforced wire eyes and the hinge eyes, the said rods having threaded ends for engaging the threaded apertures in the bottom member.

7. A transplanting pot comprising a base member, a tubular side member disposed upon the base member and consisting of a pair of longitudinal sections having their meeting ends bent inwardly to form loops and, provided at spaced intervals or points with transversely extending recesses and resulting spaced eyes, the eyes at the meeting ends of one section being disposed between, and in registration with the eyes at the adjacent meeting end of said section, the opposite inwardly bent meeting ends of said sections being returned respectively upon themselves across the adjacent point between said sections, whereby the joints between the sections are shielded from engagement with the contents of the pot, outwardly bent extensions at the upper ends of each of said returned portions of the sections overlying the upper end of the adjacent joint between said sections respectively, each of said outwardly bent extensions being provided with an opening in registration with the eyes at the adjacent meeting ends of the sections, locking pins extending through said openings respectively and through the registering eyes of adjacent meeting ends and securing said sections together, and means for detachably securing said locking pins to the base member.

WILLIAM C. HILLS.

Witnesses:
I. WEIL,
PAUL E. TURTLOTTE.

Copies of this patent may be obtained for five cents each, by addressing the "Commissioner of Patents, Washington, D. C."